United States Patent
Miyoshi et al.

(10) Patent No.: US 7,976,028 B2
(45) Date of Patent: Jul. 12, 2011

(54) NON-ASBESTOS GASKET

(75) Inventors: Takeshi Miyoshi, Sanda (JP); Hiroki Hayashi, Sanda (JP); Masao Konaka, Sanda (JP); Yoshinari Kobuchi, Sanda (JP); Hiroyuki Sasakura, Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 11/890,424

(22) Filed: Aug. 6, 2007

(65) Prior Publication Data

US 2008/0036161 A1 Feb. 14, 2008

(30) Foreign Application Priority Data

Aug. 11, 2006 (JP) ................................. 2006-219986

(51) Int. Cl.
*F16J 15/12* (2006.01)
(52) U.S. Cl. ........ 277/652; 277/612; 277/649; 277/651; 277/654
(58) Field of Classification Search .................. 277/612, 277/649, 651, 652, 654, 593–595
See application file for complete search history.

(56) References Cited

U.S. PATENT DOCUMENTS

| | | | | |
|---|---|---|---|---|
| 805,645 A * | 11/1905 | Guillott | ......................... | 277/612 |
| 843,394 A * | 2/1907 | Haynes | ......................... | 277/595 |
| 922,130 A * | 5/1909 | Goetze | ......................... | 277/612 |
| 1,030,055 A * | 6/1912 | Darlington, Jr. | ............. | 277/612 |
| 2,397,597 A * | 4/1946 | Dunkle | ......................... | 277/649 |
| 3,721,452 A * | 3/1973 | Black | ............................ | 277/609 |
| 4,335,890 A * | 6/1982 | Nicholson | ..................... | 277/595 |
| 5,421,594 A * | 6/1995 | Becerra | ........................ | 277/608 |
| 5,558,347 A * | 9/1996 | Nicholson | ..................... | 277/652 |
| 5,785,322 A * | 7/1998 | Suggs et al. | .................. | 277/615 |
| 6,089,572 A * | 7/2000 | Plunkett | ....................... | 277/592 |
| 6,092,811 A * | 7/2000 | Bojarczuk et al. | ............ | 277/627 |
| 6,142,483 A * | 11/2000 | Bryant, III | .................... | 277/598 |
| 6,260,854 B1 * | 7/2001 | Lemon | ......................... | 277/609 |
| 6,367,803 B1 * | 4/2002 | Loth | ............................. | 277/321 |
| 6,371,489 B1 * | 4/2002 | Combet et al. | ................ | 277/594 |
| 6,457,726 B1 * | 10/2002 | Jung | ............................. | 277/611 |
| 6,845,983 B1 * | 1/2005 | Suggs et al. | .................. | 277/314 |
| 7,234,705 B2 * | 6/2007 | Novil et al. | ................... | 277/593 |
| 2004/0160017 A1* | 8/2004 | Diez et al. | ..................... | 277/593 |
| 2005/0116427 A1* | 6/2005 | Seidel et al. | .................. | 277/610 |

(Continued)

FOREIGN PATENT DOCUMENTS

JP 58-15088 1/1983

(Continued)

*Primary Examiner* — Alison K Pickard
(74) *Attorney, Agent, or Firm* — DLA Piper LLP (US)

(57) ABSTRACT

By improving a metal gasket having a corrugated portion which is advantageous in sealing property, a non-asbestos gasket in which the sealing property is further improved is provided. A non-asbestos gasket has a three-layer structured sealing portion S configured by: a core layer 1A which is made of a plate of a metal, and which is formed into a concentric circle-like corrugated shape; and surface layers 2, 3 which are made of expanded graphite, and which are stacked on the front and back faces of the core layer, respectively. In an outer circumferential end of the sealing portion S, the core layer 1A is protruded from the front and back surface layers 2, 3 toward an outer diameter side. In an inner circumferential end of the sealing portion S, the front and back surface layers 2, 3 are protruded from the core layer 1A toward an inner diameter side, thereby covering the core layer 1A.

4 Claims, 11 Drawing Sheets

U.S. PATENT DOCUMENTS

2005/0173868 A1* 8/2005 Hatamura et al. ............ 277/593
2006/0290072 A1* 12/2006 Chen et al. .................... 277/593
2007/0170659 A1* 7/2007 Hatamura et al. ............ 277/595
2008/0174075 A1* 7/2008 Diez et al. ..................... 277/595
2008/0237998 A1* 10/2008 Chen et al. .................... 277/595

FOREIGN PATENT DOCUMENTS

JP 2005-90699 4/2005

* cited by examiner

NON-ASBESTOS GASKET

BACKGROUND OF THE INVENTION

1. Field of the Invention

The present invention relates to a non-asbestos gasket such as a metal gasket which is to be used in, for example, a connecting portion between flange pipes, and that between a fluid apparatus such as a valve and a pipe.

2. Explanation of Related Art

Usually, a conventional gasket is produced by using asbestos as disclosed in Japanese Patent Application Laying-Open No. 58-15088. However, because of hazardous properties of asbestos, conventional gaskets made of asbestos are gradually converted to those made of other materials. Also in a usual application of pipes, substitution of an asbestos joint sheet gasket is further promoted. As a gasket material which is a substitute for asbestos, recently, a metal and the like attract attention.

A metal gasket is used in an environment of very high pressure and temperature, and hence the fastening pressure (or the minimum load surface pressure) required in sealing is high, or namely a large fastening force is necessary. Therefore, means for fastening and fixing a metal gasket by using plural bolts is usually employed. Depending on the section shape of a sealing portion, metal gaskets are classified into various types including a flat type, a corrugated type, a saw tooth type, etc. In a piping system for a fluid such as liquid, a concentric circle-like and corrugated metal gasket is often used. As a metal gasket having a reduced number of corrugations, for example, a gasket which is to be interposed between a cylinder in an engine and a cylinder head is known as disclosed in Japanese Patent Application Laying-Open No. 2005-90699.

In a metal gasket having a corrugated section (also called "corrugated gasket"), a thin metal plate is formed into a concentric circle-like corrugated shape to obtain a high contact pressure, and the spring effect of the metal is added to improve the sealing properties. Such a metal gasket has features that, although made of a metal, a sufficient sealing function is obtained at a relatively low fastening pressure, and that it has high heat resistance. Therefore, such a metal gasket is often used in a fluid apparatus such as a valve.

An example of a metal gasket having a large number of corrugations is a metal gasket g which is to be interposed between flange pipes as shown in FIG. 11 in order prevent a fluid from leaking. The metal gasket g shown in FIG. 11 is configured by a pressed steel plate, and has: a center hole 38 having an inner diameter which is equivalent to the diameter of internal flow paths w of flange pipes 31, 32; and a sealing portion 37 which has an annular shape having an outer diameter that does not interfere with mounting bolts 35, and in which the section is formed into a concentric circle-like (or substantially concentric circle-like) corrugated shape.

In a metal gasket for preventing a fluid from leaking, a measure for improving the sealing properties is taken by disposing a corrugated portion as described above. Since such a metal gasket is based on metal-to-metal contact, however, the fact is that the metal gasket is still inferior to an asbestos joint sheet gasket with respect to the performance of preventing a fluid from leaking, i.e., the sealing property. A non-asbestos gasket seems to have room for further improvement.

SUMMARY OF THE INVENTION

In view of the above-mentioned circumstance, it is an object of the invention to further improve a non-asbestos gasket having a corrugated portion which is advantageous in sealing property, thereby realizing and providing a gasket in which the sealing property is further improved.

The invention is a non-asbestos gasket having:

a core layer 1A which is made of a metal plate, which is formed into a concentric or substantially concentric corrugated shape, which cooperates with expanded graphite-made surface layers 2, 3 that are stacked on front and back faces of the core layer, respectively, to form a three-layer structured sealing portion S, and which is protruded from the front and back surface layers 2, 3 toward an outer diameter side in an outer circumferential end of the sealing portion; and the surface layers 2, 3 which are made of expanded graphite, which are stacked on the front and back faces of the core layer 1A, respectively, and which are configured to be protruded from the core layer 1A toward an inner diameter side in an inner circumferential end of the sealing portion S, thereby covering the core layer 1A.

According to the invention, a concentric seal loop is formed, so that a local fastening pressure can be set to be high. Even in a low-toque fastened state in which fastening is attained by fastening means such as bolts, therefore, the gasket exhibits an excellent sealing property. Furthermore, the amount of compression of the gasket in fastening can be set to be large, and hence the gasket is excellent in conformability to a sealed surface such as a flange surface, and in following property with respect to the surface accuracy of the sealed surface. Since the gasket has such features, there is a further advantage that, in a place where an asbestos joint sheet gasket is conventionally used, a sealing property equivalent to or more than that obtained by the asbestos joint sheet gasket can be obtained without changing the manner of the fastening management.

In the invention, in the non-asbestos gasket, the sealing portion S has:

a corrugated portion 4 having the corrugated shape;

an inner-circumferential flange portion 5 which is formed continuously with an inner diameter side of the corrugated portion 4, in which an outer diameter side end is positioned on an identical or substantially identical plane with one end in a thickness direction of the corrugated portion 4, and which is formed into a tapered face in a state where the face is closer to the side remote from another end in the thickness direction as more advancing toward an inner diameter side end; and an outer-circumferential flange portion 6 which is formed continuously with an outer diameter side of the corrugated portion 4.

According to the invention, although described in detail in the paragraph of preferred embodiments, in the case where the non-asbestos gasket is attached between a pair of sealed surfaces while compressing the gasket to a specified state, the reduction ratio that is a ratio at which the inner end is moved toward the inner diameter side by the compression is reduced as compared with the case of a gasket configured only by a metal. Therefore, it is possible to obtain advantages that the measure of diameter differences in the case where the diameter of the inner end in a free state is set to be slightly larger than that of an internal flow path in anticipation of the diameter reduction deformation due to the gasket compression can be reduced, and that a failure in which a fluid flow is disturbed by an unexpected protrusion of the inner end into the internal flow path hardly occurs.

In the invention, in the non-asbestos gasket, the sealing portion S has:

a corrugated portion 4 having the corrugated shape;

an inner-circumferential flange portion 5 which is formed continuously with an inner diameter side of the corrugated portion 4, and which is placed on an identical or substantially identical plane with one end in a thickness direction of the corrugated portion 4; and an outer-circumferential flange portion 6 which is formed continuously with an outer diameter side of the corrugated portion 4, and which is placed on an identical or substantially identical plane with one end in the thickness direction of the corrugated portion 4, and on a same side as the inner-circumferential flange portion 5.

As in the invention, when the inner- and outer-circumferential flange portions are placed on an identical or substantially identical plane with one end in the thickness direction of the corrugated portion, and on the same side, the gasket is compressed under the state where both the inner and outer circumferential ends are supported by a sealed surface on the same side. As compared with the case where the inner and outer circumferential ends butt respectively against different sealed surfaces, therefore, the compression is performed more effectively, and the sealing property can be improved.

In the invention, in the non-asbestos gasket, the corrugated shape is formed at an irregular pitch in which an interval of crests which are adjacent to each other in a radial direction of the corrugated portion 4 is smaller as more advancing toward an inner diameter side of the corrugated portion 4.

As in the invention, when an irregular pitch which is smaller as more advancing toward the inner diameter side is employed, the butting state which is more compact as more advancing toward the inner diameter side is attained when the gasket is compressed between a pair of sealed surface.

Therefore, there is an advantage that the sealing property can be further improved.

In the invention, in the non-asbestos gasket, the corrugated shape is formed at an irregular pitch in which an interval of crests which are adjacent to each other in a radial direction of the corrugated portion 4 is smaller as more advancing toward an inner diameter side of the corrugated portion 4.

As in the invention, when an irregular pitch which is smaller as more advancing toward the inner diameter side is employed, the butting state which is more compact as more advancing toward the inner diameter side is attained when the gasket is compressed between a pair of sealed surface. Therefore, there is an advantage that the sealing property can be further improved.

In the invention, in the non-asbestos gasket, the corrugated shape is formed at an irregular pitch in which an interval of crests which are adjacent to each other in a radial direction of the corrugated portion 4 is smaller as more advancing toward an inner diameter side of the corrugated portion 4.

As in the invention, when an irregular pitch which is smaller as more advancing toward the inner diameter side is employed, the butting state which is more compact as more advancing toward the inner diameter side is attained when the gasket is compressed between a pair of sealed surface. Therefore, there is an advantage that the sealing property can be further improved.

DESCRIPTION OF THE PREFERRED EMBODIMENTS

Figure 1:
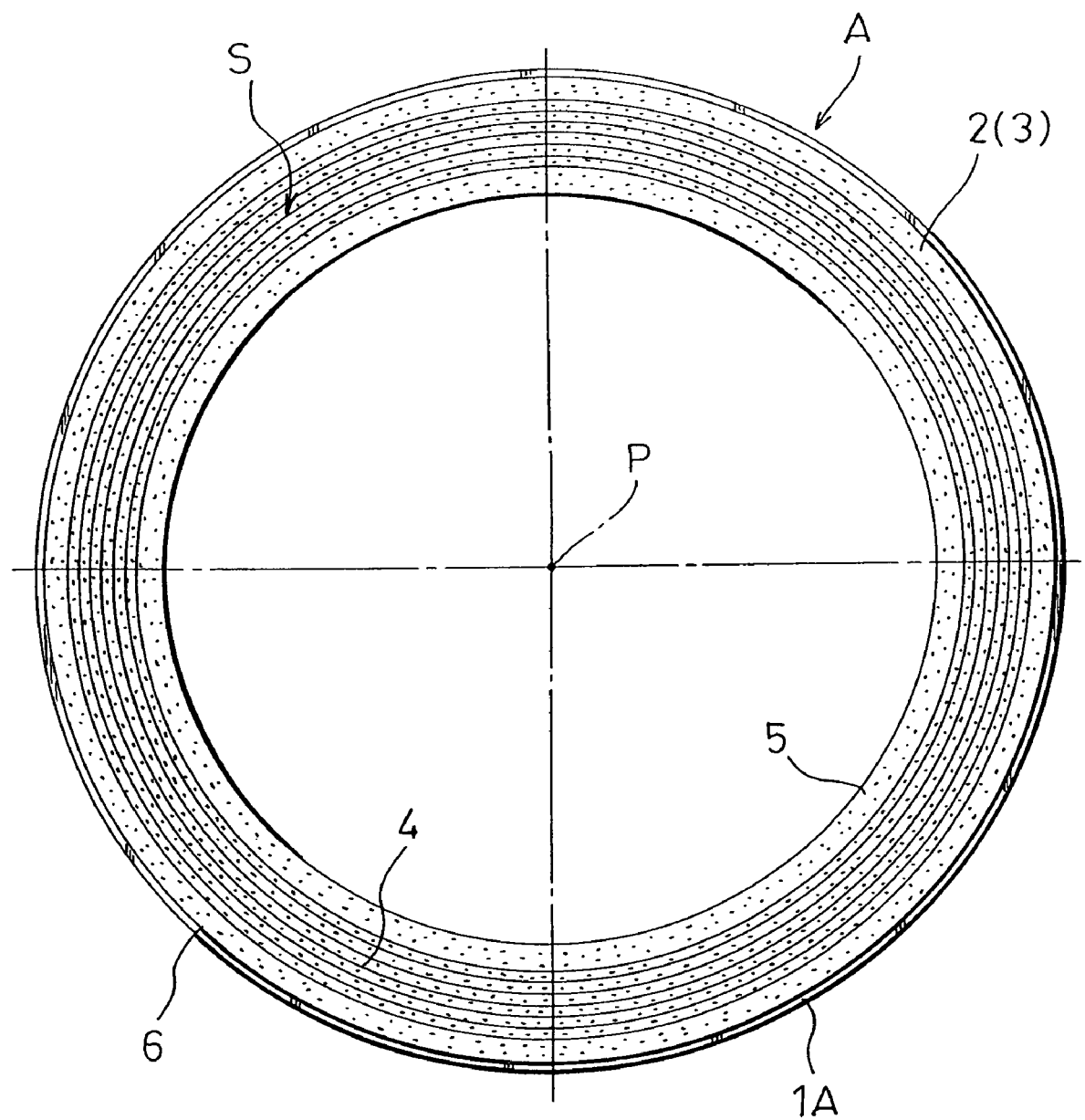
FIG. 1 is a front view of a non-asbestos gasket of Embodiment 1.
Figure 2:
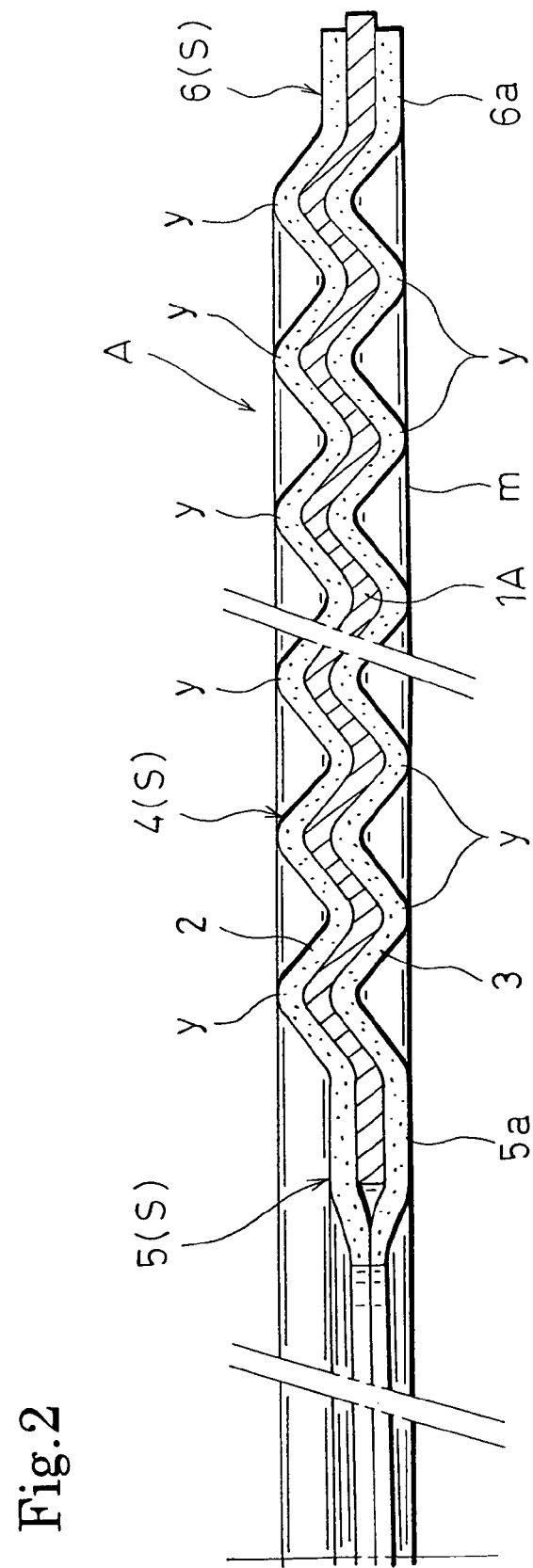
FIG. 2 is a section view of the non-asbestos gasket of FIG. 1.
Figure 3:
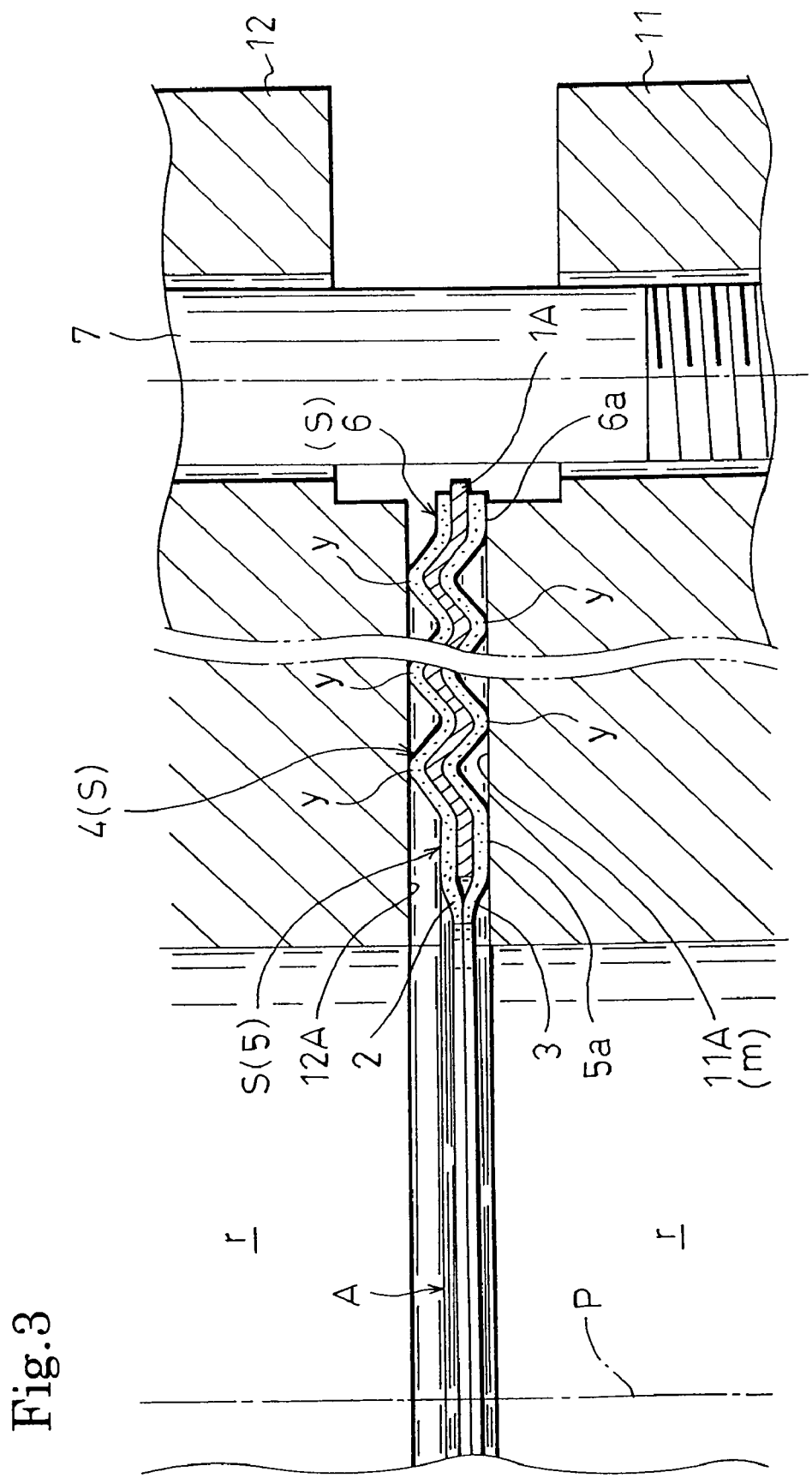
FIG. 3 is a section view of main portions showing a bolt attaching portion of the non-asbestos gasket of FIG. 1.
Figure 4:
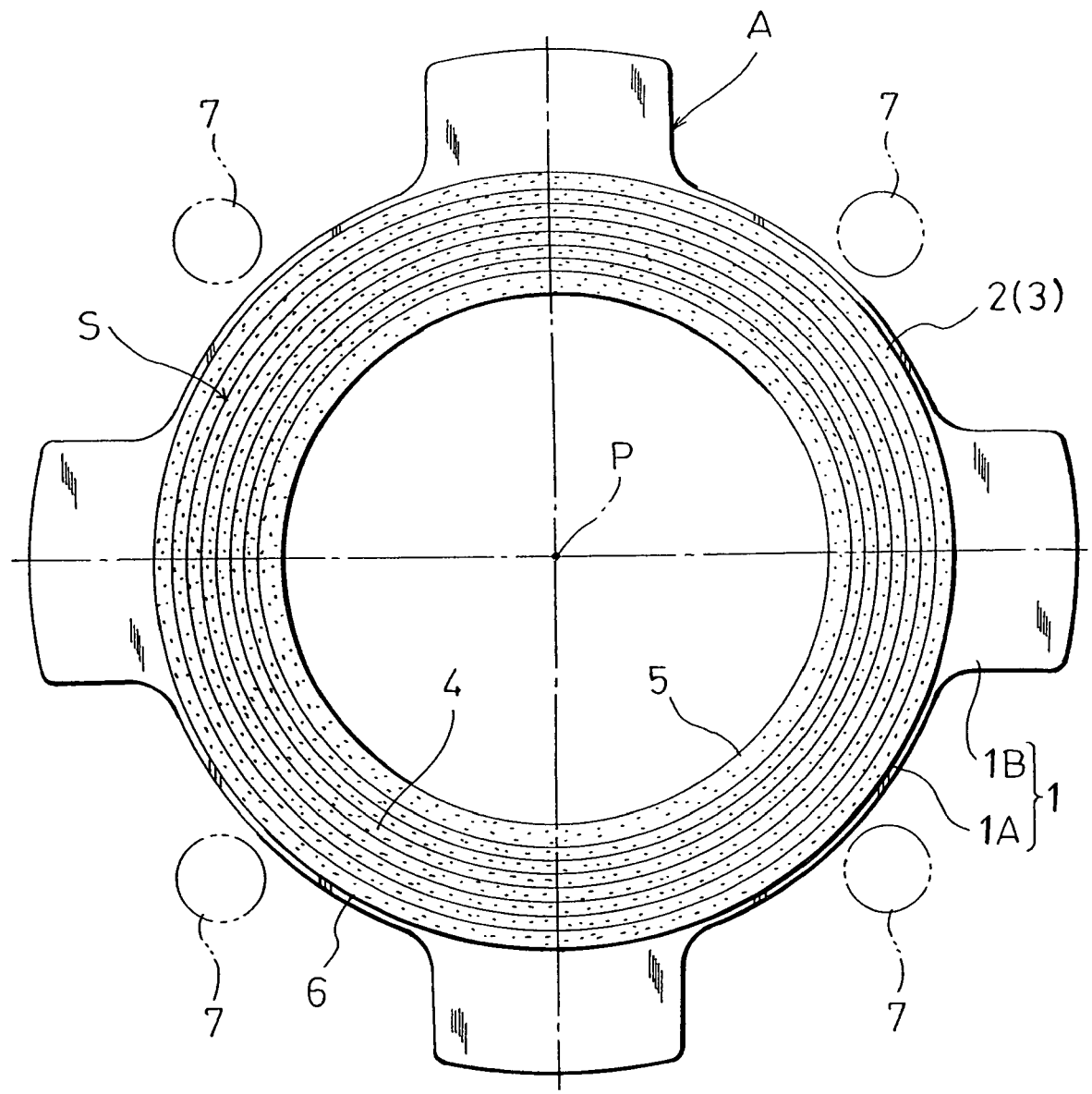
FIG. 4 is a front view of a non-asbestos gasket of Embodiment 2.
Figure 5:
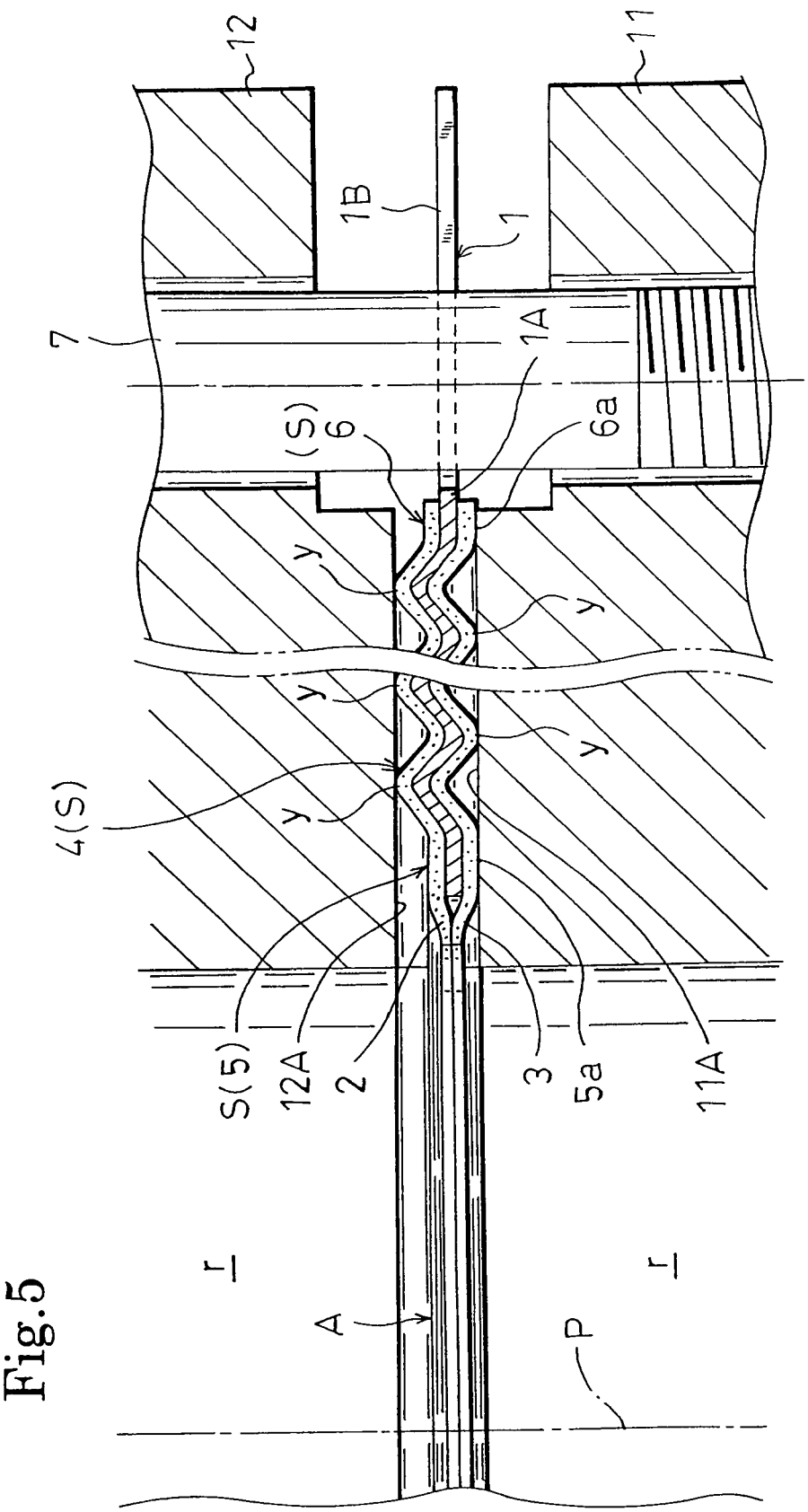
FIG. 5 is a section view of main portions showing a bolt attaching portion of the gasket of FIG. 4.
Figure 6A:
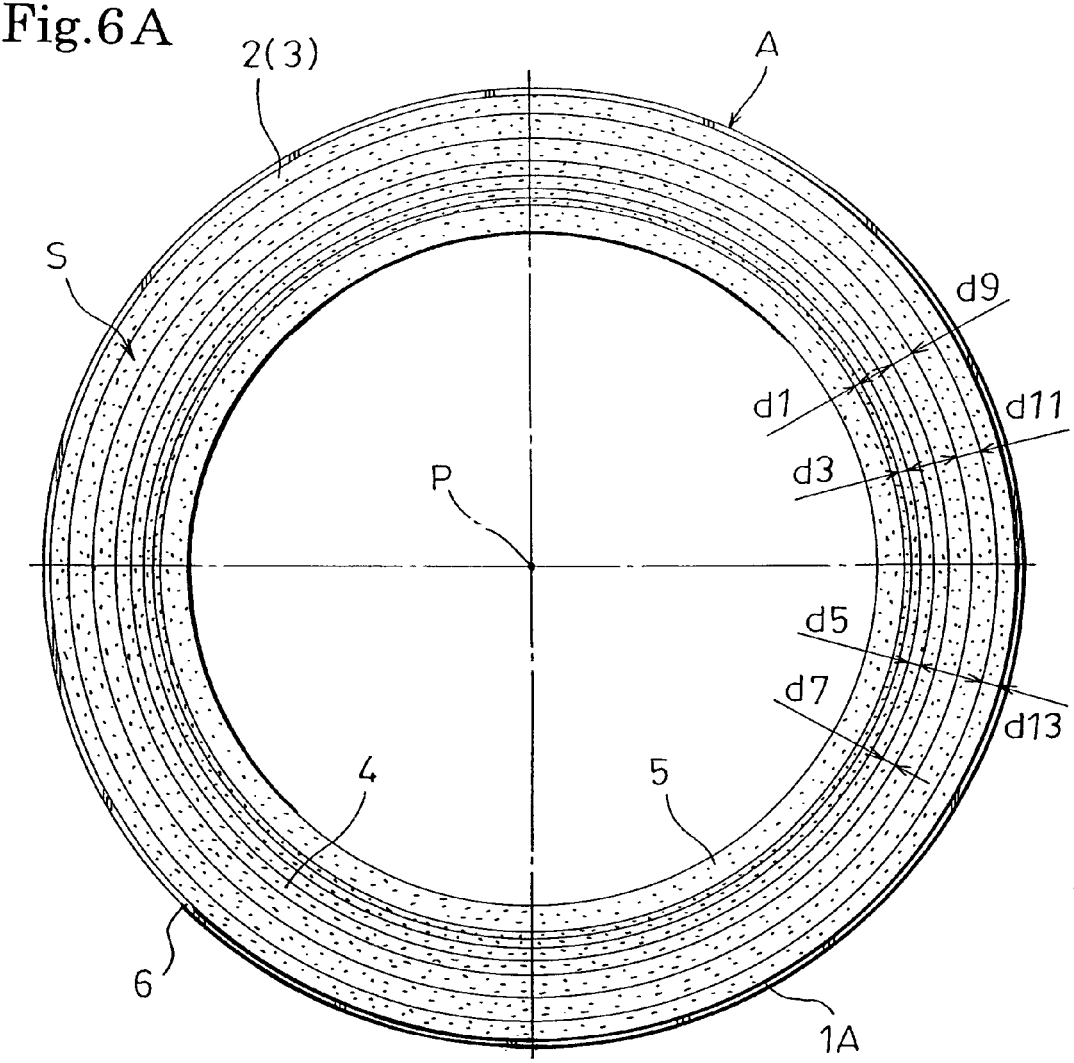
FIGS. 6A and 6B are front and section views of a non-asbestos gasket of Embodiment 3, respectively.
Figure 6B:
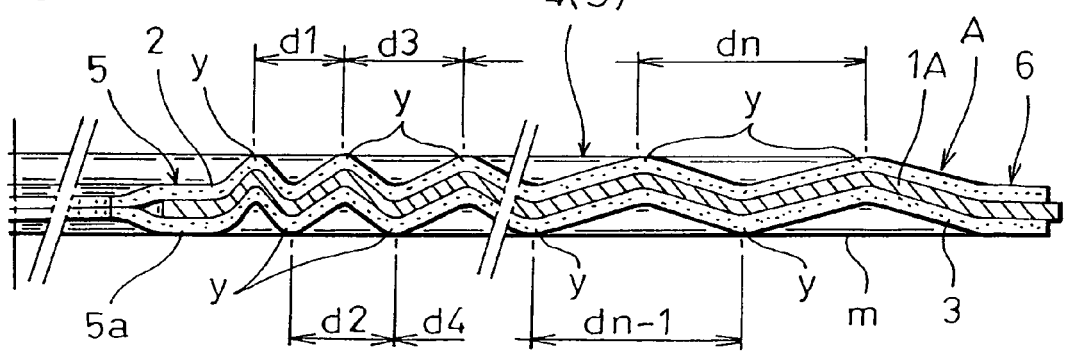
Figure 7A:
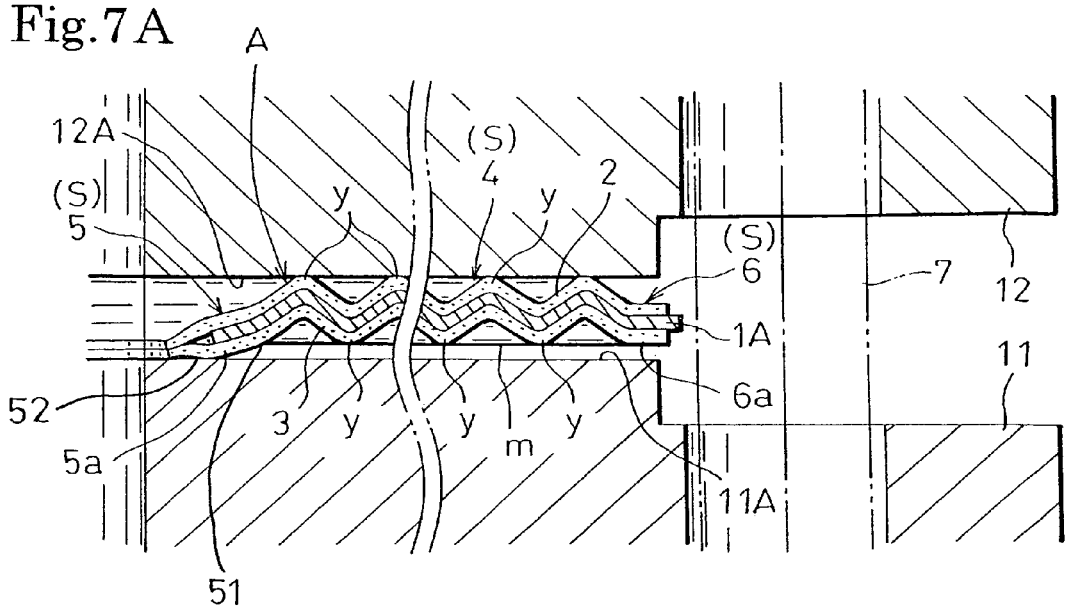
FIGS. 7A and 7B are views of a non-asbestos gasket of Embodiment 4 showing a free state and a state after fastening, respectively.
Figure 7B:
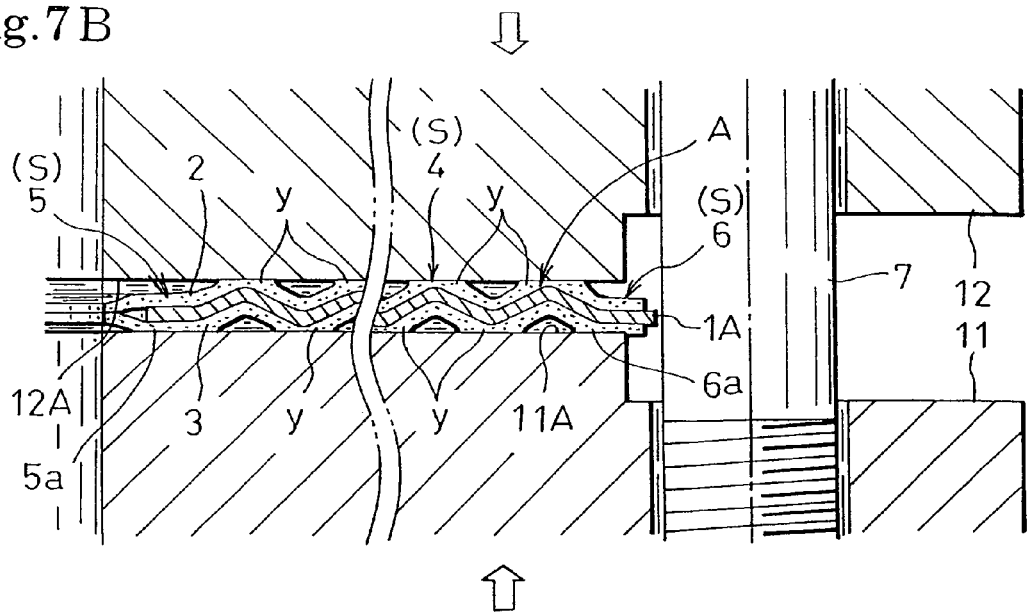
Figure 8:
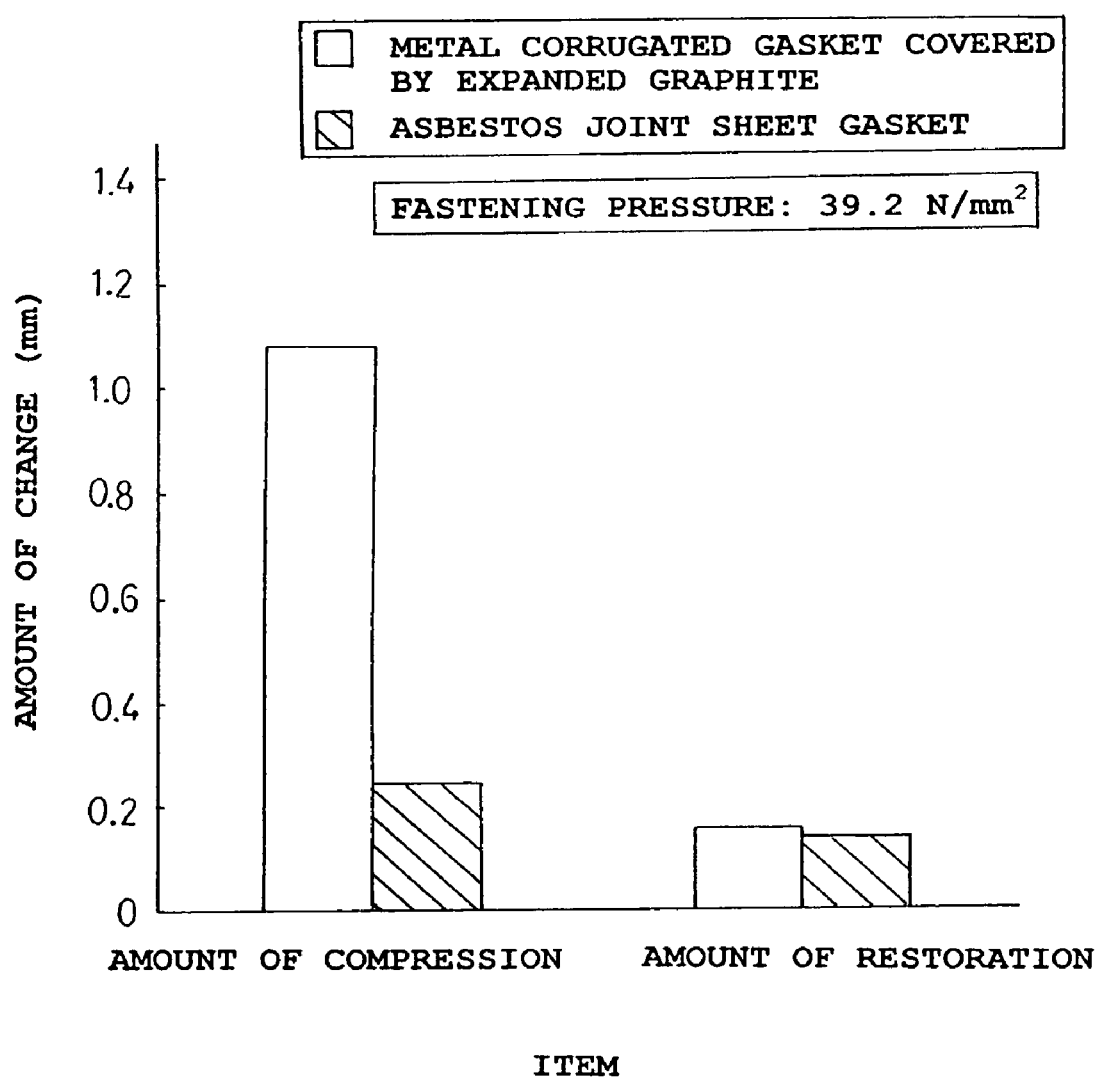
FIG. 8 is a graph showing compression and restoration characteristics.
Figure 9:
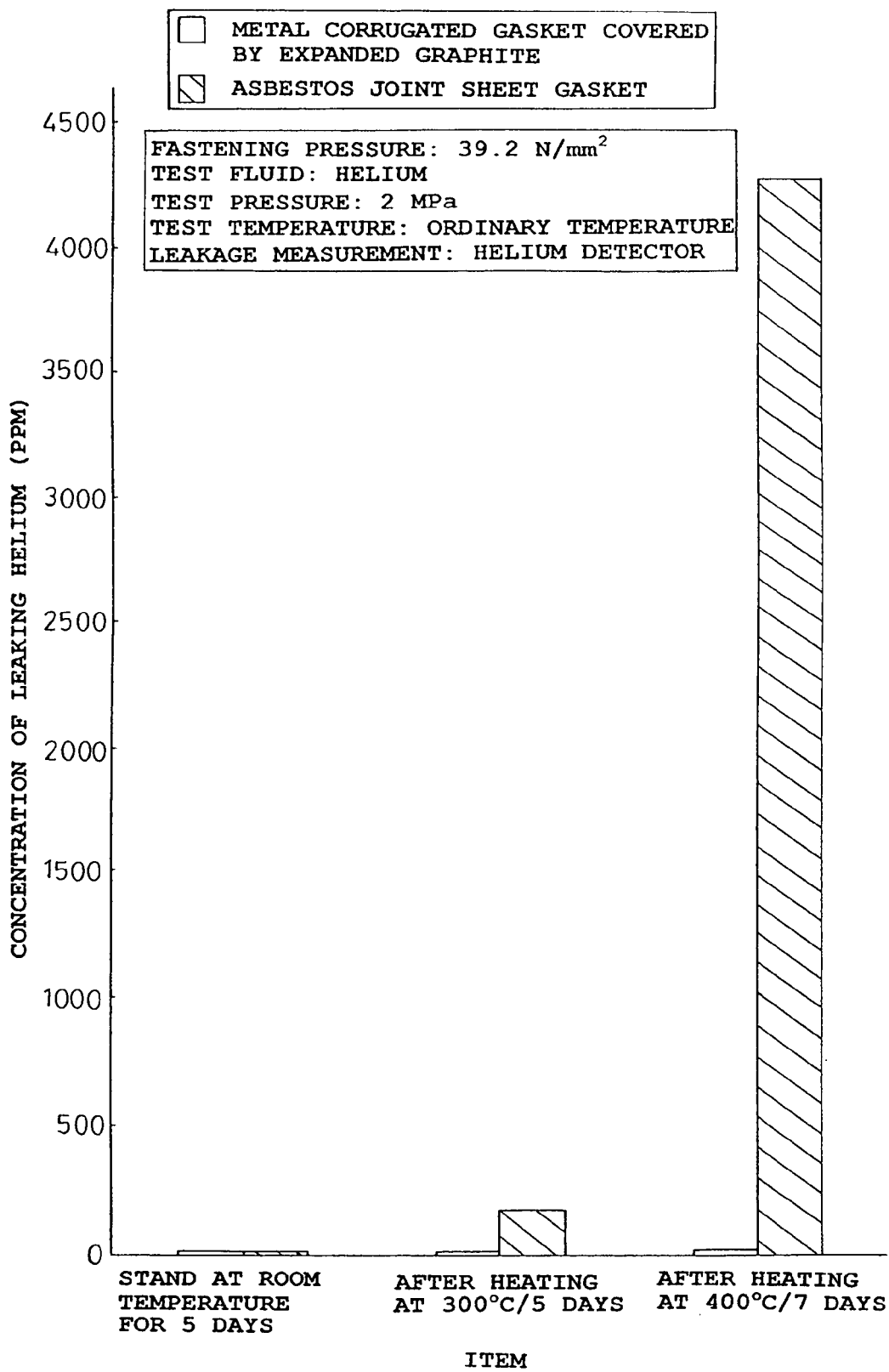
FIG. 9 is a graph showing helium-gas sealing characteristics after a heat cycle.
Figure 10:
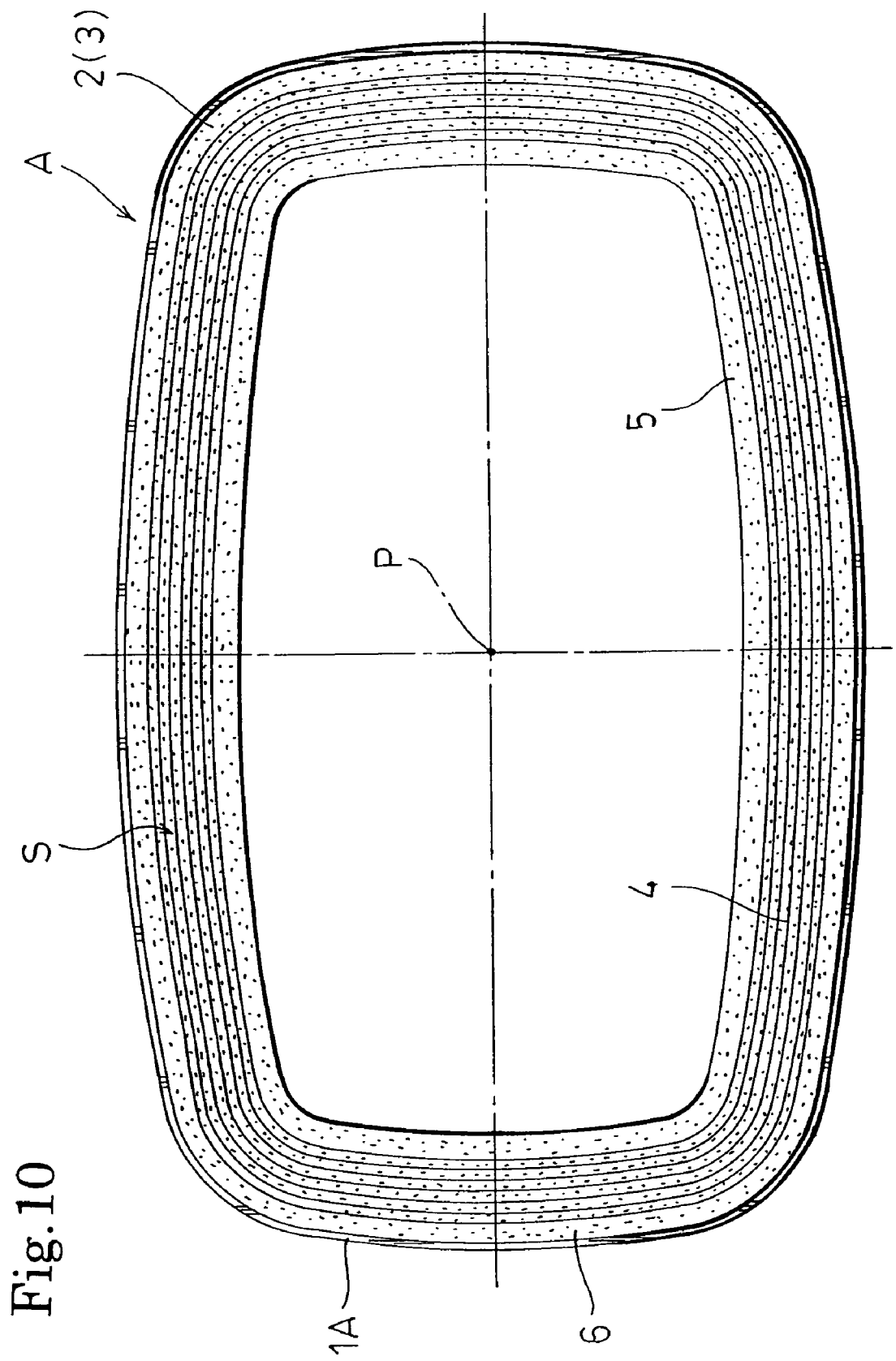
FIG. 10 is a front view showing a non-asbestos gasket (another embodiment) having a substantially elliptical shape.
Figure 11:
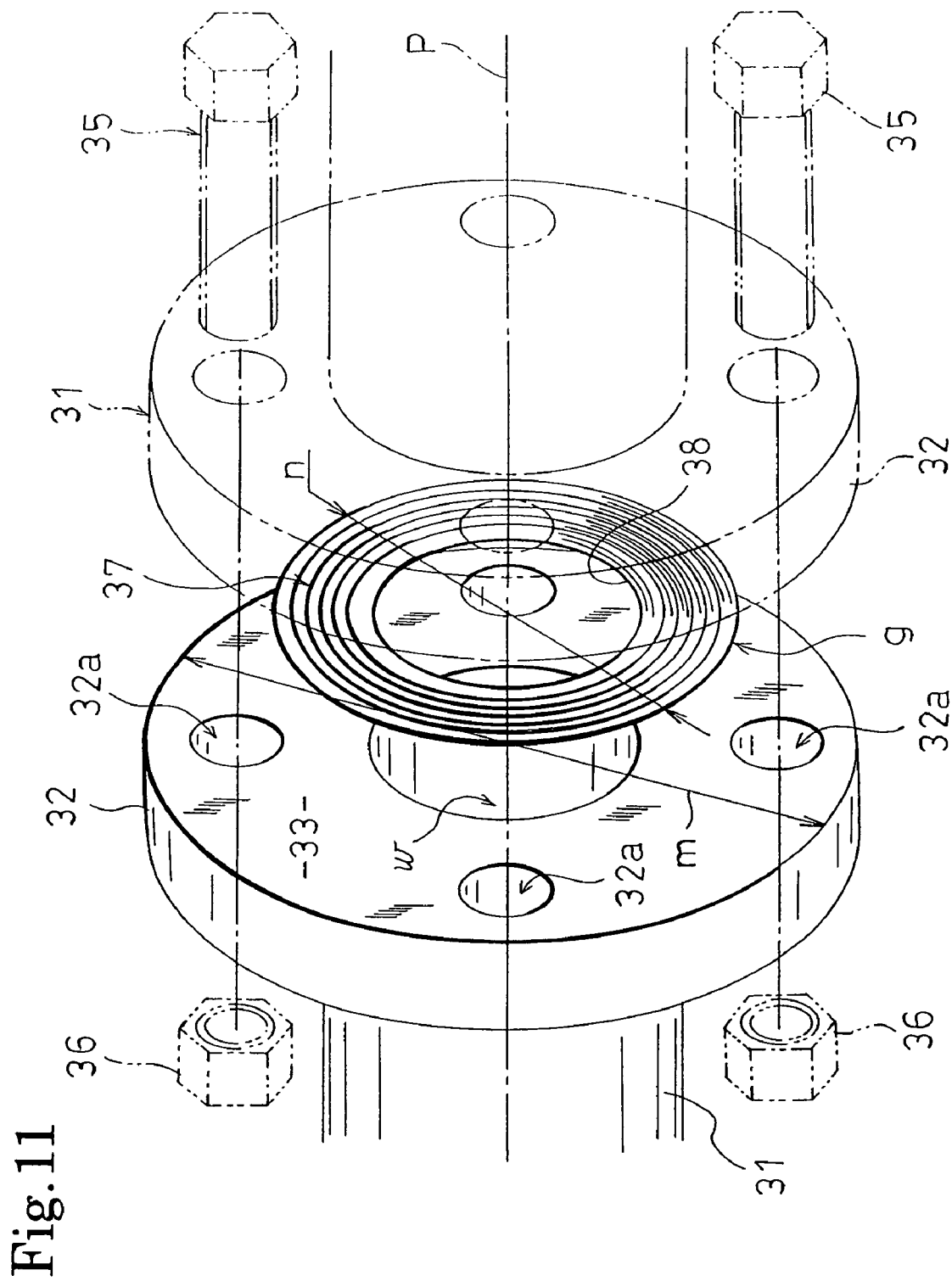
FIG. 11 is a perspective view showing a conventional metal gasket and the mounting situation.

Hereinafter, embodiments of the non-asbestos gasket of the invention will be described with reference to the accompanying drawings. FIGS. 1 to 3 show Embodiment 1, FIGS. 4 and 5 show Embodiment 2, FIG. 6 shows Embodiment 3, and FIG. 7 shows Embodiment 4. FIGS. 8 and 9 show various characteristic graphs, and FIG. 10 is a front view of a non-asbestos gasket of another embodiment.

Embodiment 1

FIGS. 1 to 3 show a non-asbestos gasket A of Embodiment 1. The non-asbestos gasket A has a three-layer structured sealing portion S configured by: a core layer 1A which is made of a plate of a metal such as stainless steel, and which is formed into a concentric circle-like (an example of a concentric shape) corrugated shape having an axis P; and surface layers 2, 3 which are made of expanded graphite, and which are stacked on the front and back faces of the core layer 1A, respectively. The sealing portion S is configured by a corrugated portion 4 having a corrugated shape, and inner- and outer-circumferential flange portions 5, 6 which are formed continuously with the inner and outer diameter sides of the corrugated portion, respectively. The inner- and outer-circumferential flange portions 5, 6 are placed on the identical plane with the lower side which is one end of the thickness direction of the corrugated portion 4, and on the same side.

Namely, the sealing portion is formed so that the peaks of the lower crests y of the corrugated portion 4, and bottom faces 5a, 6a of the inner- and outer-circumferential flange portions 5, 6 are included in the same virtual plane m. In FIG. 3, an end face 11A of a first flange pipe 11 which is on the lower side corresponds to the virtual plane m. FIG. 3 shows a free state of the non-asbestos gasket A where the upper and lower crests y are in light contact with end faces (sealed surfaces) 11A, 12A of first and second flange pipes 11, 12 each having an internal flow path r, or the non-asbestos gasket A is not compressed between the end faces 11A, 12A, but simply interposed between the end faces.

In an outer circumferential end of the sealing portion S, i.e., an outer circumferential end of the outer circumferential flange portion 6, the core layer 1A is slightly protruded from the front and back surface layers 2, 3 toward the outer diameter side. Namely, the outer diameter of the core layer 1A is slightly larger than the outer diameters of the front and back (upper and lower) surface layers 2, 3, and the metal portion is exposed. In an inner circumferential end of the sealing portion S, i.e., an inner circumferential end of the inner circumferential flange portion 5, the front and back surface layers 2, 3 are more protruded than the core layer 1A toward the inner diameter side, and processed in a direction (vertical direction) along which the surface layers are in close contact with each other. As a result, the inner circumferential end is configured so that the core layer 1A is not exposed but covered.

The inner and outer diameters of the non-asbestos gasket A are set so that, when the non-asbestos gasket A is in the free state, as shown in FIG. 3, the diameter of the inner circumferential end of the inner-circumferential flange portion 5 is slightly larger than that of the flow path r, and a distinct radial gap exists between the outer circumferential end of the outer-circumferential flange portion 6, i.e., the outer circumferential end of the core layer 1A, and fastening bolts 7. In a state (not shown) where the fastening bolts 7 are fastened with a specified torque and the non-asbestos gasket A is compressed, the gasket is slightly inflated in the inner and outer diameter sides, and hence the diameters are set so that displacement occurs in which the diameter of the inner circumferential end of the inner-circumferential flange portion 5 coincides or substantially coincides with that of the flow path r, and the outer circumferential end of the core layer 1A is in light contact with the fastening bolts 7 or a very small gap is formed therebetween.

Therefore, the core layer 1A which is made of a metal material is not exposed in the flow paths r, r of the flange pipes 11, 12 which are connected to each other through the non-asbestos gasket A, and hence a fluid which must avoid a contact with a metal, such as a chemical solution or a wash solution can be used. The core layer 1A which is made of a metal material is exposed on the outer circumference. When the non-asbestos gasket A is in contact with the fastening bolt 7 in the case of assembling or the like, only the core layer 1A is in contact with the fastening bolt. Therefore, it is possible to achieve a preferred effect that a fear that the surface layers 2, 3 which are made of expanded graphite bump against the fastening bolt 7 and collapse, and this adversely affects the sealing property is avoided. The non-asbestos gasket A of Embodiment 1 is configured by only the circular sealing portion S.

The above-described non-asbestos gasket A of Embodiment 1 has the following various features. The features will be briefly described in a supplemental manner. Items of the features are structure and feature, characteristics (compression and restoration characteristics, helium-gas seal test after a heat cycle), etc.

[Structure and Feature]

The gasket is a semi-metallic gasket in which the core layer 1A that is a core member and a thin metal plate (for example, a stainless steel material that is a standard pipe material) is formed into a corrugated shape, and the expanded graphite sheets 2, 3 which have a sealing property and a heat resistance are stacked on the both faces of the layer. According to the configuration, a local fastening pressure can be set to be high by forming a concentric circle-like seal loop. Even in a low-torque fastened state in a process of fastening a bolt, therefore, the gasket exhibits an excellent sealing property. Furthermore, the amount of compression of the gasket in bolt fastening can be set to be large, and hence the gasket is excellent in conformability to the flange surface, and in following property with respect to the surface accuracy of the flange. Since the gasket has such features, there is an advantage that, in a place where an asbestos joint sheet gasket is conventionally used, a sealing property equivalent to or more than that obtained by the asbestos joint sheet gasket can be obtained without changing the manner of the fastening management.

[Compression and Restoration Characteristics]

FIG. 8 shows an example of the compression and restoration characteristics of the non-asbestos gasket A of Embodiment 1, in the form of a graph for comparison to an asbestos joint sheet gasket. As seen from the graph, the amount of compression of the non-asbestos gasket A is ensured to be about 5 times that of an asbestos joint sheet gasket.

[Helium-Gas Seal Test after a Heat Cycle]

FIG. 9 shows an example of the helium-gas sealing characteristics after a heat cycle of the non-asbestos gasket A of Embodiment 1, in the form of a graph for comparison to an asbestos joint sheet gasket. As seen from the graph, as compared with an asbestos joint sheet gasket, in the non-asbestos gasket A, the sealing property in the use at a high temperature can be stabilized at a high level.

Embodiment 2

As shown in FIGS. 4 and 5, the non-asbestos gasket A of Embodiment 2 comprises a gasket main portion 1 configured by: the core layer 1A; and projection pieces 1B which are formed integrally at four places of the outer circumferential side of the core layer, respectively. The other configuration is identical with that of the non-asbestos gasket A of Embodiment 1. Therefore, components which are identical with those of the non-asbestos gasket A of Embodiment 1 are denoted by the same reference numerals.

The four projection pieces 1B are arranged about the center P of the gasket at intervals of equal angle (90 deg.), and formed to be in the identical plane with the outer-circumferential flange portion 6. Preferably, the fastening bolts 7 are placed in four places between adjacent projection pieces 1B, 1B, respectively as shown in FIG. 4. The projection pieces 1B can function as nip portions for positioning in assembling the non-asbestos gasket A, or carrying the gasket, and therefore is convenient.

Embodiment 3

As shown in FIG. 6, the non-asbestos gasket A of Embodiment 3 is formed at an irregular pitch in which the interval of crests which are adjacent to each other in a radial direction of the corrugated portion 4, i.e., the radial intervals between the crests y is smaller as more advancing toward the inner diameter side of the corrugated portion 4. Specifically, when the intervals of adjacent crests y, y are indicated as dn (n=1, 2, 3, . . . ) in the sequence beginning with the inner-diameter side, the relationships of $d1<d2<d3<\ldots<dn-1<dn$ are established. The other configuration is identical with that of the non-asbestos gasket A of Embodiment 1.

Embodiment

In the non-asbestos gasket A of the Embodiment, as shown in FIG. 7, an outer diameter side end 51 of the inner-circumferential flange portion 5 is positioned on an identical (or substantially identical) plane with the lower end (an example of one end) in the thickness direction of the corrugated portion 4, and the inner-circumferential flange portion is formed into a tapered face in a state where the face is closer to the lower side (an example of the side remote from another end in the thickness direction) as more advancing toward an inner diameter side end and the inner diameter side end 52 is positioned on a lower side than the outer diameter side end. The other configuration is identical with that of the non-asbestos gasket A of Embodiment 1. Therefore, components which are identical with those of the non-asbestos gasket A of Embodiment 1 are denoted by the same reference numerals.

In a free state where only a bottom face 5a of the inner end (the inner diameter side end) 52 of the inner-circumferential flange portion 5 is in contact with the end face 11A of the first flange pipe 11, the fastening bolts 7 are turned to compress the non-asbestos gasket A of Embodiment, and then the inner-circumferential flange portion 5 is deformed so as to be folded back about the inner diameter side end 52 toward the horizontal plane. In the side of the gasket bottom face, therefore, the butting pressure of the bottom face 5a of the diameter side end 52 is gradually raised by the elasticity due to the downward bending of the inner-circumferential flange portion 5. In this case, the lower surface layer 3, i.e., the expanded graphite is in direct contact with the end face 11A, and a coefficient of friction which is higher than that in the case where the core layer (metal) 1A is in contact with the end face is produced. Therefore, a frictional drag against the force by which the corrugated portion 4 tries to perform the radial expanding displacement due to the compression acts at a higher degree than that in the case where a metal is in contact with the end face.

As a result, the reduction ratio that is a ratio at which the inner diameter side end 52 is moved toward the inner diameter side when the fastening bolts 7 are fastened with a specified torque is reduced as compared with the case of a gasket configured only by a metal. Therefore, it is possible to obtain advantages that the measure of diameter differences in the case where the diameter of the inner diameter side end 52 in the free state is set to be slightly larger than the diameter of the internal flow path r in anticipation of the diameter reduction deformation due to the gasket compression can be reduced, and that a failure in which a fluid flow is disturbed by an unexpected protrusion of the inner diameter side end 52 into the internal flow path r hardly occurs.

Other Embodiments

The gasket of the invention may be the non-asbestos gasket A comprising the core layer 1A made of a metal plate which has a concentric and substantially elliptical shape, and which is formed into a corrugated shape as shown in FIG. 10. This gasket is identical with the non-asbestos gasket A of Embodiment 1 except that the shape in a front view is different, and the corresponding components are denoted by the corresponding reference numerals. As the concentric or substantially concentric shape, various shapes such as elliptic, oval, rectangular, and polygonal shapes may be employed.

What is claimed is:
1. A non-asbestos gasket having:
a core layer which is made of a metal plate, which is formed into a concentric or substantially concentric corrugated shape, which cooperates with expanded graphite-made surface layers that are stacked on front and back faces of said core layer, respectively, to form a three-layer structured sealing portion, and which is protruded from said front and back surface layers toward an outer diameter side in an outer circumferential end of said sealing portion; and wherein:
said surface layers which are made of expanded graphite, which are stacked on the front and back faces of said core layer, respectively, are configured to be protruded from said core layer toward an inner diameter side in an inner circumferential end of said sealing portion, thereby covering said core layer;
the three-layer structured sealing portion has a corrugated portion having a corrugated shape; and
said three-layer structured sealing portion has:
an inner-circumferential flange portion which is formed continuously with an inner diameter side of said corrugated portion, in which an outer diameter side end is positioned on an identical or substantially identical plane with one end in a thickness direction of said corrugated portion;
the inner circumference flange portion is formed into a tapered face in a state where the tapered face is closer to a side remote from another side in the thickness direction as more advancing toward an inner diameter side end of the inner-circumference flange portion and the inner diameter side end is positioned on a side more remote from the another side in the thickness direction than the outer diameter side end;
a first portion of said tapered face is at a first angle with respect to a vertical line;
an end portion of said tapered face is at a second angle with respect to a vertical line;
said second angle is greater than said first angle; and
an outer-circumferential flange portion which is formed continuously with an outer diameter side of said corrugated portion.
2. A non-asbestos gasket according to claim 1, wherein a diameter of said core layer is larger than a diameter of said expanded graphite made surface layers and protrudes in an outer diameter side therefrom.
3. A non-asbestos gasket according to claim 1, wherein said gasket has a substantially elliptical shape.
4. The non-asbestos gasket according to claim 1, wherein a side of a bottom face of an inner circumferential flange portion protrudes more outwardly than a thickness of said sealing portion.

* * * * *